June 27, 1961 E. E. COURCHENE, JR., ET AL 2,990,520

DELTA MODULATION SYSTEM

Filed Nov. 19, 1959 3 Sheets-Sheet 1

INVENTORS,
ERNEST E. COURCHENE, JR
JOHANN HOLZER
BY *Harry M. Saragovitz*
ATTORNEY INVENTORS,
ERNEST E. COURCHENE, JR
JOHANN HOLZER
BY Harry M. Saragovitz
ATTORNEY.

INVENTORS,
ERNEST E. COURCHENE, JR
JOHANN HOLZER
BY Harry M. Saragovitz
ATTORNEY.

United States Patent Office 2,990,520

Patented June 27, 1961

2,990,520
DELTA MODULATION SYSTEM

Ernest E. Courchene, Jr., Norwalk, Conn., and Johann Holzer, Long Branch, N.J., assignors to the United States of America as represented by the Secretary of the Army Filed Nov. 19, 1959, Ser. No. 854,212
13 Claims. (Cl. 332—11)
(Granted under Title 35, U.S. Code (1952), sec. 266)

The invention described herein may be manufactured and used by or for the Government for governmental purposes without the payment of any royalty thereon.

This invention relates to pulse transmission systems and more particularly to improvements in delta-type modulation systems.

Delta modulation is defined as a type of modulation in which the signal to be modulated is sampled in time and the difference between two adjacent samples is translated into a code. Such a modulation system employs the one-digit binary or unit code and may be considered as a pulse frequency modulation system in which the time between pulses is quantized and in which the frequency of the output pulse series is proportional to the first derivative of the function of time of the input information signal.

In such a system, positive or negative pulses are sent from transmitter to receiver at a preassigned rate. The transmitted pulses are applied to identical integrating circuits at the transmitter and receiver. Prior to the transmission of each pulse, the output from the integrator at the transmitter is compared with the original input signal. If the original signal is larger than the output from the integrator, a positive pulse is transmitted to build up the integrator output, while if the original signal is smaller than that from the integrator, a negative pulse is transmitted to reduce the integrator output. The output of the integrator thus approximates the input signal by means of plus or minus step functions. The quantizing noise in such systems is relatively high and to further increase the signal-to-noise ratio an exponential delta system has been proposed and is described in Holzer Patents No. 2,892,980 and No. 2,859,408. In the exponential delta modulation system, the integrating circuit is replaced by a two-pole coding network whose response curve more closely approximates the input signal. The effective steps are not equal as in the conventional case, but depend on the voltage across the capacitor of the RC network at the time a pulse is fed into the coding network. While the use of such coding networks provided a better match to the input modulating signal than could be achieved with the conventional delta modulation system, the signal-to-noise ratio still proved to be relatively small. Furthermore, such exponential delta system as shown in Patent No. 2,859,408 required constant adjustment to maintain the stability thereof.

It is an object of the present invention to provide an improved exponential delta modulation system wherein a much improved signal-to-noise ratio is achieved.

It is a further object of the present invention to provide an exponential delta modulation system which requires a minimum of adjustment and yet provides more stable operation.

In accordance with the present invention, the delta modulation system includes a source of input signal voltage and a coding network having an input, an output, and a reference terminal to which is applied the input signal. Also included is a time quantizing circuit having its output in series connection with the output terminal of the coding network and means responsive to the output of the time quantized signals for producing constant amplitude pulses when the quantized signals exceed a prescribed amplitude level. In addition, there is included a pulse widener circuit responsive to each of the constant amplitude pulses for producing pulses having a duration substantially equal to the time interval between successive constant amplitude pulses applied thereto, and means responsive to the output of the pulse widener circuit having its output in series connection to the input terminal of the coding network whereby there is produced at the output of the coding network a signal approximating the input signal but opposite in polarity thereto. The error signal between the approximated signal and the input signal derived at the output of the coding network is quantized in time by the output of the time quantizing circuit.

For a better understanding of the invention, together with other and further objects thereof, reference is had to the following description taken in connection with the accompanying drawings in which.

Figure 1:
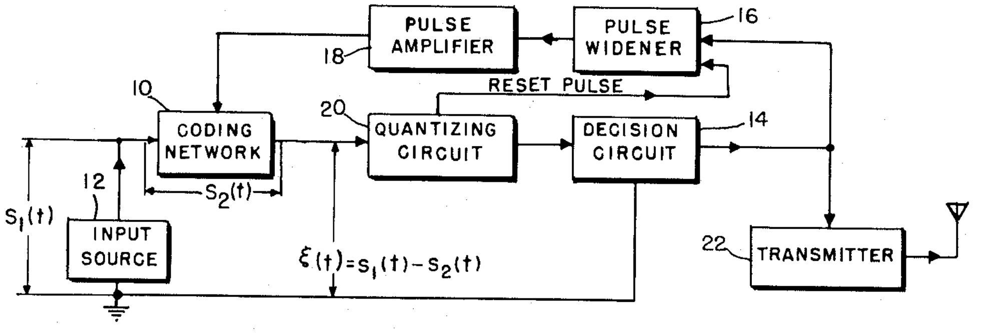
FIG. 1 is a block diagram of the delta modulation system in accordance with the present invention.
Figure 2:
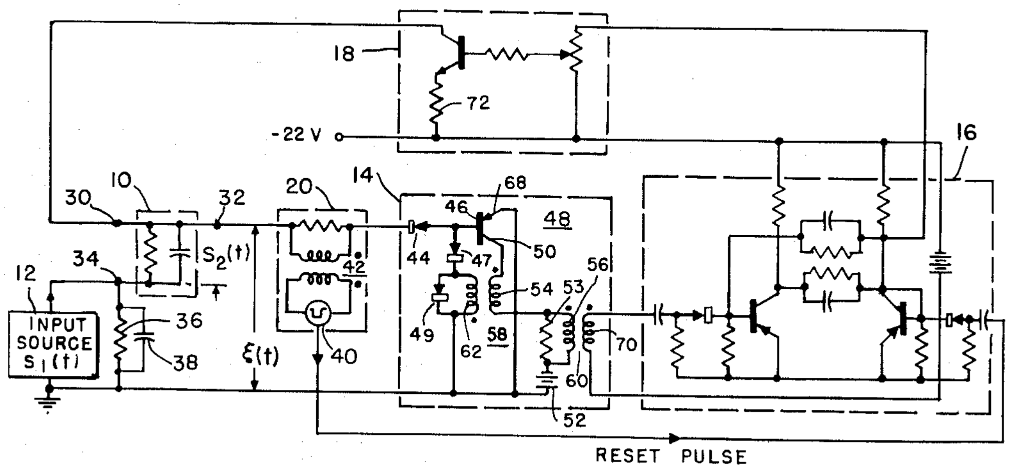
FIG. 2 illustrates a schematic circuit of the delta modulation system.
Figure 7:
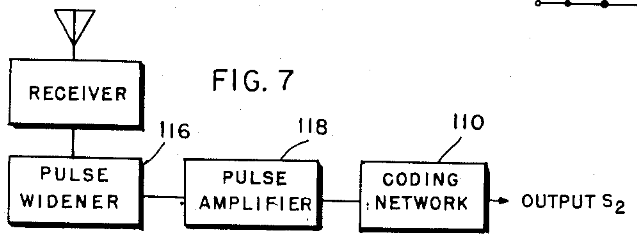
Figure 5:
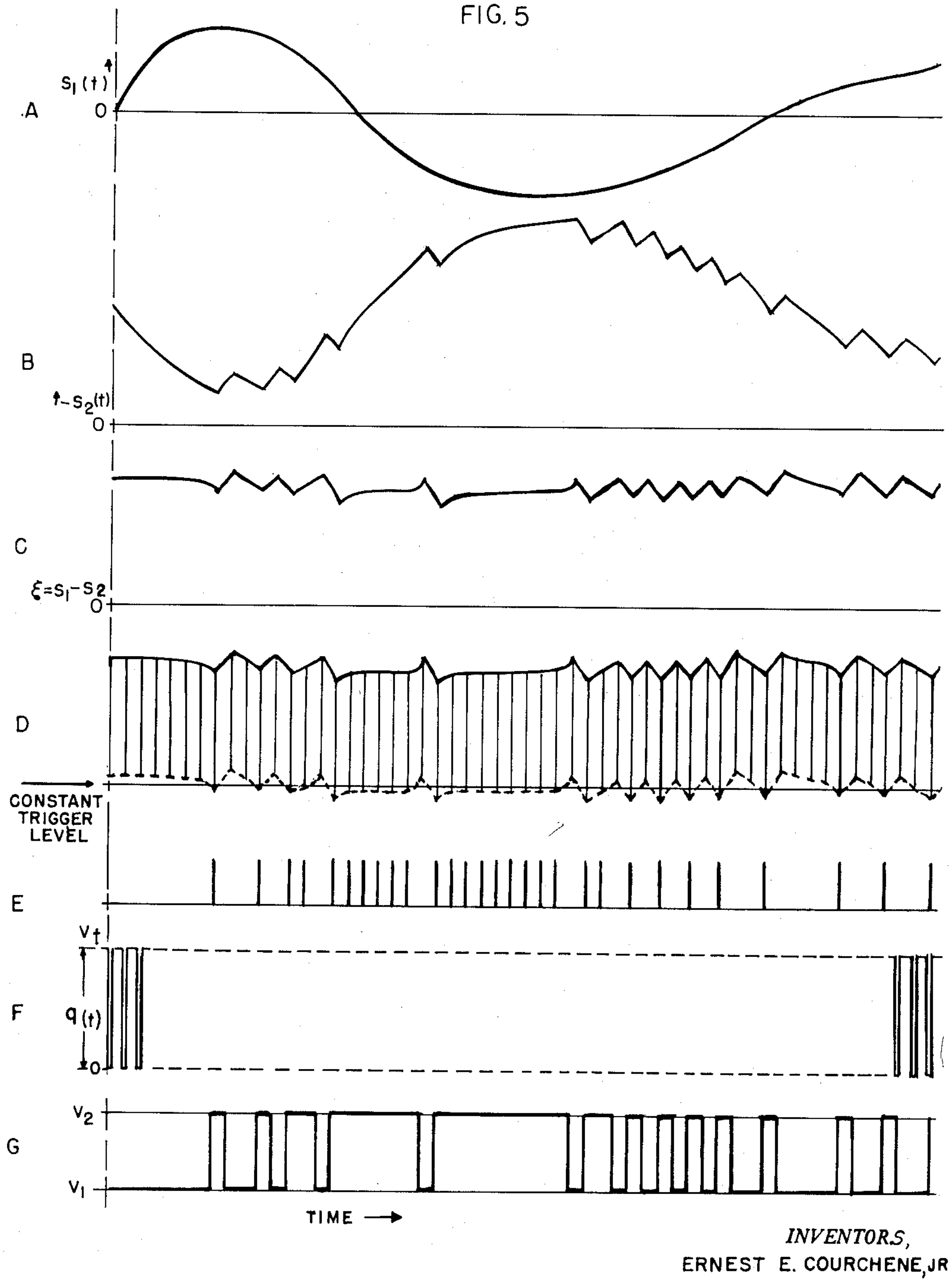
Figure 6:
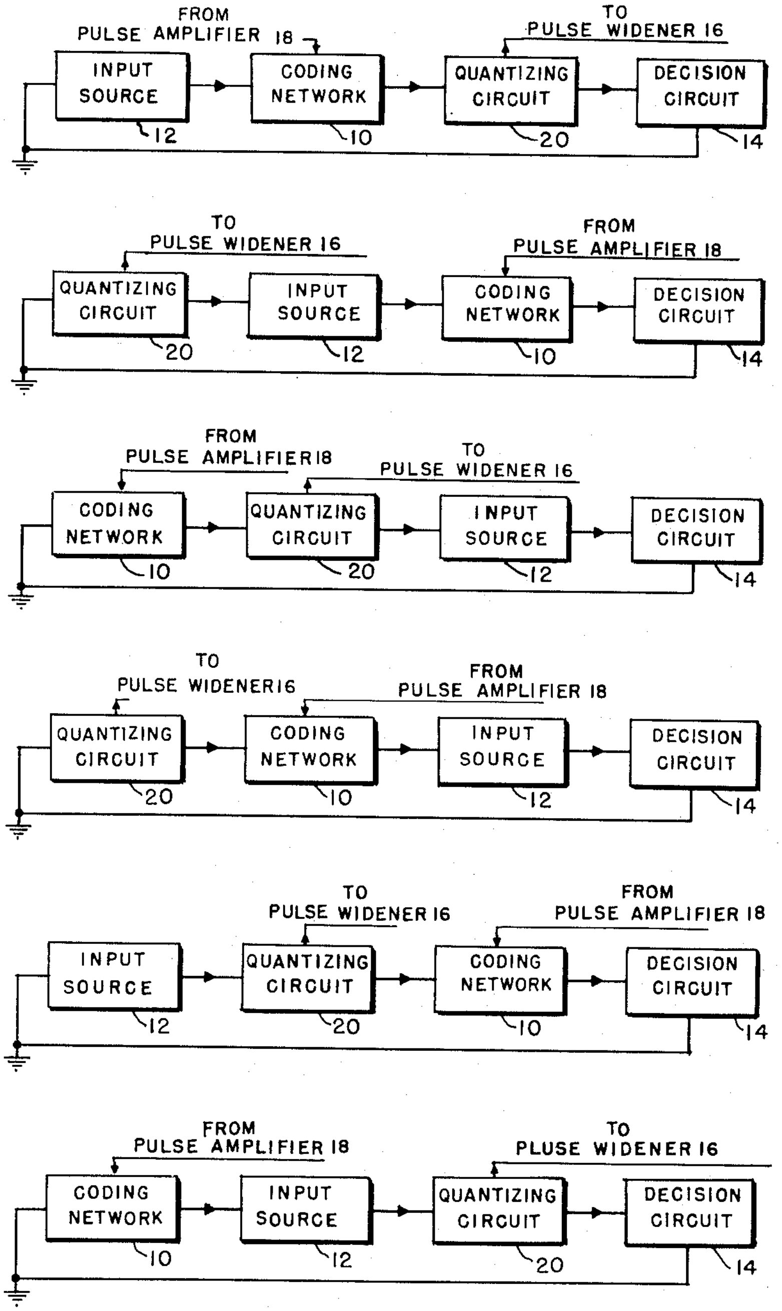

FIG. 5 includes several plots illustrating the operation of the circuit;

FIG. 6 illustrates various connections of several components of the system shown in FIGS. 1 and 2; and FIG. 7 is a block diagram of a delta modulation receiver system to be used with the system shown in FIGS. 1 and 2.

Referring now to FIG. 1 of the drawing which is a block diagram of the delta modulation system in accordance with my invention, 10 is a four-pole pulse coding network to which is applied the input signal $S_1(t)$ derived from input source 12 and the output of a pulse amplifier 18 as hereinbelow described. The pulse coding network 10 is comprised of passive elements having a prescribed impulse response function. At 14 there is provided a decision circuit which either produces a pulse or no pulse depending on the level of the signal at its input. The output of the decision circuit 14 is applied to a pulse widener circuit 16, the output of which is converted to current pulses through the pulse amplifier 18. These current pulses are fed back to the coding network 10 to provide a type of negative feedback such that there is developed at the output of coding network 10 a signal $S_2(t)$ differing from the original signal $S_1(t)$ by an amount $\epsilon(t)$ which is the error signal introduced in the coding process. The error signal $\epsilon(t)$ is fed to the input of decision circuit 14 through the time quantizing circuit 20 which may comprise a conventional pulse timing source well known in the art. With reference to the input signal $S_1(t)$, the voltage developed at the output of coding network 10 by the negative feedback is designated as $-S_2(t)$ so that the error signal $\epsilon(t)=S_1(t)-S_2(t)$. The quantizing or timing signals $q(t)$ from source 20 adds a pulse to the error signal $\epsilon(t)$ at a specified rate and the decision circuit 14 is biased so that it only produces a pulse when the quantized error signal exceeds a predetermined level. With no quantizing signal present, the error signal $\epsilon(t)$ is so small in magnitude that it can not trigger the decision circuit 14. The output pulse derived from decision circuit 14 at prescribed times determined by the quantizing signals are uniformly shaped and are transmitted as the delta-modulation signal by means of any suitable transmitter 22. As a result, the output of decision circuit 14 may be said to be quantized in amplitude and time. While the quantizing source 20 is shown in FIG. 1 as being physically located between the output of coding network 10 and decision circuit 14, it is only necessary that the input signal $S_1(t)$, the output of coding network $-S_2(t)$ and the quantizing signal $q(t)$ be in series arrangement in order to satisfy the relationship $$S_1(t)-S_2(t)=\epsilon(t)$$

Thus, in addition to the schematic arrangement shown in FIG. 1, the arrangements shown in FIG. 6 may also be utilized insofar as the location of coding network 10, input signal $S_1(t)$, quantizing signal source $q(t)$, and decision circuit 14 are concerned.

FIG. 2 is a detailed schematic diagram of the delta-modulation system shown in FIG. 1. Referring now to FIG. 2, where like numerals refer to like elements, the coding network 10 is shown as comprising a parallel RC circuit having an input terminal 30, an output terminal 32, and a common reference terminal 34. The input signal $S_1(t)$, referenced to ground, is applied to reference terminal 34 from input source 12 which is shunted by the parallel arranged circuit comprising resistor 36 and capacitor 38. The parallel RC combination 36—38 provides a low impedance path across input source 12 for the quantizing pulses so that they do not interfere with the input signal $S_1(t)$ applied to the reference terminal 34 of the coding network 10. As shown, quantizing signal source 20 comprises negative timing signals derived from pulse signal generator 40, the output of which is added through transformer 42 to the error signal $\epsilon(t)$ derived from the output terminal 32 of coding network 10. It is to be understood of course that any other suitable quantizing or time signal source well known in the art may be used. As will hereinafter be explained, the output of coding network 10 with respect to the common reference terminal 34 may be designated by $-S_2(t)$ which, when combined with the input signal $S_1(t)$, provides an error signal $\epsilon(t)$, referenced to ground, at the output of coding network 10. This error signal is quantized by the negative timing pulses derived from source 40 and applied as the input to decision circuit 14. With such an arrangement, the input signal $S_1(t)$, the output of coding network $-S_2(t)$ and the quantizing signal $q(t)$ are in series connection so that the input to decision circuit 14 is $S_1(t)-S_2(t)+q(t)=\epsilon(t)+q(t)$.

Decision circuit 14 includes an input diode 44 poled to pass negative pulses and having its anode connected to the base electrode 46 of a junction type transistor 48 herein shown as the PNP type. Base electrode 46 is also connected to ground through series connected diodes 47 and 49 which are poled to pass positive pulses. As shown, the cathode of diode 47 is connected to the anode of diode 49 whose cathode is grounded. Collector electrode 50 of junction transistor 48 is serially connected to the negative terminal of a power source 52 through the primary winding 54 of transformer 58 and load resistor 53 across which is connected the primary winding 56 of output transformer 60. The secondary winding 62 of transformer 58 is connected in parallel arrangement across diode 49. Emitter 68 of junction transistor 48 is connected directly to the positive terminal of power source 52 which is grounded. As shown, transformer 58 is connected with the polarity of its windings opposite so that it will couple an inverted collector pulse back to the base through diode 47 at an impedance level comparable to the base impedance. The output of primary winding 56 of transformer 60 is applied through a non-inverting secondary winding 70 as one input to a pulse widener circuit 16 which comprises a conventional flip-flop circuit. The output of quantizer generator 40 is applied as a reset pulse to a second input of flip-flop circuit 16. The parameters of circuit 16 are chosen such that a pulse coming from decision circuit 14 will be widened to almost the whole time interval between two successive pulses derived therefrom. Thus, when triggered by output pulses from decision circuit 14, a pulse is derived from the output of flip-flop circuit 16 which depends upon the presence of pulses at the output of decision circuit 14. When no pulses from decision circuit 14 are present, the flip-flop circuit 16 is reset by the output from quantizer generator 40 to the zero or quiescent state. Since such flip-flop circuits are so well known in the art, it is believed that no detailed description thereof is necessary.

The pulses derived from flip-flop circuit 16 are fed to pulse amplifier 18, which may comprise a conventional common emitter amplifier with negative current feedback. Resistor 72 in the emitter circuit of amplifier 18 provides the negative feedback current which serves to make the collector output look like a high impedance current source. The output pulses of flip-flop circuit 16 are thus converted into current pulses which in turn are fed back to coding network 10 and combined or added with the input signal $S_1(t)$ to produce the error signal $\epsilon(t)$. The pulses derived from decision circuit 14 comprise the binary code which is transmitted by means of transmitter 22.

In discussing the operation of the delta-modulation coder, reference is made to the curves shown in FIG. 5. The input signal $S_1(t)$ is shown in FIG. 5A. The output of the coding network 10, $-S_2(t)$, resulting from the pulses derived from pulse widener circuit 16 and amplifier 18 is shown in FIG. 5B and the exponential error signal $\epsilon(t)=S_1(t)-S_2(t)$ is shown in FIG. 5C. The quantized error signal $q(t)$ is shown in FIG. 5D. The timing or quantizing signals are shown in FIG. 5F. The amplified output of pulse widener circuit 16 is shown in FIG. 5G and the coded pulsed output of decision circuit 14 is shown in FIG. 5E. It is to be assumed that the quantizing signal 40 shown in FIG. 5F is a negative going signal varying in amplitude between a prescribed positive value $V_t$ and zero. $V_t$ is a constant voltage level about which the error signal $\epsilon(t)$ will fluctuate as will be explained below. The decision circuit 14 will be triggered only when the input signal applied thereto is more negative than the "break-point," or contact potential, of input diode 44 which is normally in the range of $-0.2$ to $-0.5$ volts. Thus, individually, neither the quantizing signal 40 alone nor the error signal $\epsilon(t)$ alone may trigger the decision circuit 14. At this point it would be advisable to discuss the operation of the decision circuit 14. Under the assumptions made hereinabove, a positive voltage decreasing to a negative value is applied to the input diode 44. As long as this voltage is more positive than the triggering voltage level set by the break-point of diode 44, diodes 47 and 49 will remain non-conductive. However, when the input voltage to input diode 44 becomes more negative than the trigger voltage, diode 44 draws current through the emitter-base circuit of junction transistor 48 thereby causing this transistor to conduct. The base current drawn by diode 44 is amplified in junction transistor 48 to produce a large increasing collector current through the primary winding 54 of transformer 58 and through collector load resistor 53. Due to the inverting characteristics of transformer 58, a negative voltage is induced across secondary winding 62 of transformer 58 thereby causing diode 47 to conduct and diode 44 to become open or non-conductive. The resulting circuit of junction transistor 48, transformer 58, and diode 47 form a positive feedback amplifier or blocking oscillator so that in a very short time, transistor 48 reaches saturation. At saturation, the current through transistor 48 can not increase further and thus becomes constant at a value which is determined by the parameters of the transistor and load resistor 53. The voltage across secondary winding 62 of transformer 58 now decreases exponentially with a time constant $L/R$ where L is the inductance of the transformer, R is the resistance of diode 47 and the input base-emitter resistance of transistor 48. After a time determined mainly by $L/R$, the emitter-base current of transistor 48 becomes smaller than that required for maintaining saturation. Thus, the current through transistor 48 decreases thereby inducing a positive voltage across the secondary winding 62 of transformer 58 which causes diode 47 to open and diode 49 to conduct. The increasingly positive current at the base electrode 46 rapidly drives the transistor 48 from saturation to cut-off. The secondary winding 62 then discharges through diode 49 until the current through the diode is so small that it opens and is rendered non-conductive. This comprises a full cycle during which a positive pulse is produced across collector load resistor 53. The cycle will be repeated until the input voltage is more positive than the trigger level determined by the break-point of diode 44. If the input voltage to decision circuit 14 is sampled in time, that is time-quantized, then the decision circuit will produce pulses only when the input voltage applied thereto is more negative than the trigger voltage at the time of sampling. Each pulse derived from decision circuit 14 is applied as one input to the pulse widener or flip-flop circuit 16 and the quantizing signals from source 40 are applied to the other input of flip-flop circuit 16. The normal state of flip-flop circuit 16 is shown in FIG. 5G at $V_1$. The quantizing signals tend to reset the output of flip-flop circuit 16 to its normal quiescent state level $V_1$ while the pulses derived from decision circuit 14 will produce output pulses from flip-flop circuit 16 having the amplitude $V_2$ and of a duration corresponding substantially to the time that successive decision pulses are present.

Assuming now that the error signal, $\epsilon(t)$, is that shown in FIG. 5C, the quantized error signal will be that shown in FIG. 5D. As hereinabove described, when $\epsilon(t)+q(t)$ is more negative or less than the trigger level of decision circuit 14, a pulse will be derived from decision circuit 14 and so long as $\epsilon(t)+q(t)$ is greater than this trigger level, no pulses will be derived from decision circuit 14. Thus, at indicated times (FIG. 5E) pulses will be applied from decision circuit 14 to provide an output from flip-flop circuit 16 which is shown in FIG. 5G. This output is fed back to coding network 10 after being amplified by pulse amplifier 18. For the duration of the pulses at level $V_2$ derived from flip-flop circuit 16, the coding network 10 provides an exponential increasing voltage at its output and during intervals between output pulses from flip-flop circuit 16, i.e. at level $V_1$, the coding network provides an exponential decreasing voltage at its output. The resulting signal $S_2(t)$ derived from coding network 10 approximates the input signal $S_1(t)$ applied to coding network 10 from source 12 and is shown in FIG. 5B to be inverse thereto. The difference between input signal $S_1(t)$ and the approximated signal $S_2(t)$ is the error signal $\epsilon(t)$ shown in FIG. 5C. Hence, the input to the decision circuit 14 is made up of the input signal $S_1(t)$, the decoded signal $S_2(t)$ and the quantizing signal $q(t)$ derived from source 40. The decision circuit 14 emits pulses causing the pulse current amplifier 18 to feed current into the coding network 10 as long as $\epsilon(t)$ is more negative than the constant trigger level of decision circuit 14. The input current to the coding network 10 causes an increase in the voltage at its output 32. This means that the voltage at the input to decision circuit 14 rises and eventually exceeds the trigger level. When this happens, decision circuit 14 no longer emits pulses and the output of the coding network 10 decreases. Thus, the input to decision circuit 14 will eventually fall again below the trigger level. It is apparent, therefore, that no matter what the input signal $S_1(t)$ is, the error voltage $\epsilon(t)$ at the input to decision circuit 14 will fluctuate around the constant amplitude trigger voltage level. This error signal depends on the number of decisions per second, the amplitude of current pulses, the delay through the coding network 10, the transfer characteristics of the coding network 10, and of course, the input signal $S_1(t)$. The error signals $\epsilon(t)$ can be minimized and made small compared to $S_1(t)$ or $-S_2(t)$ by proper control of the above named factors.

The pulses emitted from decision circuit 14 which are fed back through pulse amplifier 18 to coding network 10 are transmitted to a receiving device through transmitter 22. The receiver shown in FIG. 7 includes a pulse widener 116, a pulse amplifier 118, and coding network 110 identical to that in the transmitter. The output of the coding network in the receiver is then a replica of the input signal $S_1(t)$ to which an error signal $\epsilon(t)$ is added. Since $\epsilon(t)$ can, by design, be made small compared to input signal $S_1(t)$, the actual deviation of the output $-S_2(t)$ at the receiver from the input $S_1(t)$ to the transmitter does not impede the flow of intelligence.

It has been stated that $\epsilon(t)$ depends in part on the number of decisions per second, and on the characteristics of the network. If it is assumed that the characteristics of the input signal $S_1(t)$ are known and cannot be influenced, the first variable that may be adjusted for minimum $\epsilon(t)$ is the number of decisions per second. In terms of transmission the number of decisions per second represents the channel capacity in bits per second. An increase in the decision rate will make $\epsilon(t)$ smaller, but the required transmission bandwidth will increase. A compromise must therefore be made between bandwidth and level of $\epsilon(t)$ due to decision rate, setting an upper limit on this way of minimizing $\epsilon(t)$. The only remaining variable which may be used to minimize $\epsilon(t)$ and therefore maximize the output signal-to-noise ratio $$\frac{S_2(t)}{\epsilon(t)}$$

at the receiver is the network characteristics.

Figure 3:
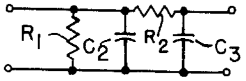
FIGS. 3 and 4 illustrate types of coding networks which may be used in the circuit of FIGS. 1 and 2.
Figure 4:
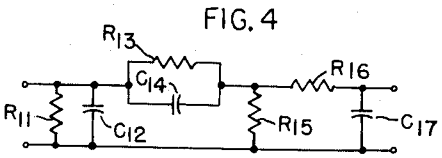

An efficient coder $$\left(\text{high value of } \frac{S_2(t)}{\epsilon(t)}\right)$$

will result if there is a one to one correspondence between the ensemble of signals which may be generated by the information source and the ensemble of pulse sequences capable of being generated by the coder. In other words, the information source is not capable of generating any signal which cannot be represented by one of the pulse sequences of the ensemble, and conversely, each possible pulse sequence represents only signals which may be generated by the information source. This condition can be approximated if the shape of the transfer characteristic of the coding network matches the shape of the average energy spectrum of the input signal $S_1(t)$. Two networks, other than the simple RC network which may be used to match the average energy of spectrum of the input signal $S_1(t)$, if $S_1(t)$ is speech, are shown in FIGS. 3 and 4.

While the improvements in $$\frac{S_2(t)}{\epsilon(t)}$$

discussed thus far are achieved by using only linear passive elements, further improvement may be achieved through the addition of a syllabic compandor. The volume distribution of the input signal may thus be equalized by a syllabic compressor if the input signal $S_1(t)$ is passed through a syllabic compressor before it is applied to the coder and the output of the decoder is passed through a corresponding expander. As a further improvement in the quality of the decoded signal, an instantaneous compressor can be utilized in series connection between the syllabic compressed input signal and the delta coder. To counteract the non-linear distortion at the transmitter due to the compressor, an instantaneous expander may be utilized at the receiver following the output of the decoding unit and in series connection therewith. However, there exists also the possibility of employing a non-linear device, a circuit comprised of diodes for example, to match the amplitude probability density distribution of the output of the coding network 10 to that of the input signal $S_1(t)$. For speech, this non-linear device may have an expanding characteristic and can be used instead of the instantaneous compandor. The receiver would also include such a non-linear device. In the modulator, the non-linear device would be connected between coding network 10 and quantizing circuit 20, with the input $S_1(t)$ being added at the output of the non-linear device. The advantage of such an arrangement over an instantaneous compandor is that the non-linear devices used at the transmitter and receiver are both of the same characteristics, and the need for matching the compressor characteristics to the expander characteristics, and vice-versa, is eliminated. By properly choosing the characteristics of the coding network together with the characteristics of the non-linear device, the input signal can be better matched in respect to all its statistical characteristics.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A delta modulation system comprising a source of input signal voltage, means including a coding network for producing a signal approximating said input signal but opposite in polarity thereto, said coding network being responsive to said approximated signal and said input signal whereby there is produced an error signal at the output of said coding network, means for time-quantizing said error signal, and means responsive to the time-quantized signals for producing pulses of constant amplitude when said quantized signal exceeds a prescribed level, the output of said last mentioned means being in circuit with said opposite polarity signal approximating means.

2. A delta modulation system comprising a source of input signal voltage, a time quantizing circuit, a coding network in series connection with said voltage source and said time quantizing circuit, means in circuit with the input of said coding network and the output of said quantizing circuit for producing a signal at the output of said coding network which approximates said input signal but opposite in polarity thereto, said approximated signal and said input signal being combined at the output of said coding network to produce an error signal at the input to said quantizing circuit whereby said error signal is quantized in time, said last mentioned means including a decision circuit responsive to the output of the time quantized signals for producing pulses of constant amplitude when the quantized signals exceed a prescribed level.

3. A delta modulation system comprising a source of input signal voltage, means including a coding network for producing a signal approximating said input signal but opposite in polarity thereto, said coding network being responsive to said approximated signal and said input signal whereby there is produced an error signal at the output of said coding network, means for time-quantizing said error signal, a decision circuit responsive to the output of said time-quantized signals such that constant amplitude pulses are developed at the output of said decision circuit when the quantized signals exceed a prescribed level, and a two-level pulse generating means having its input responsive to the pulse output of said decision circuit such that the duration of one level corresponds to the time pulses from said decision circuit are present and the duration of the second level corresponds to the time no pulses from said decision circuit are present, the output of said two-level pulse generating means being in circuit with the input of said coding network.

4. A delta modulation system comprising a source of input voltage, a coding network having an input and an output, said input voltage being applied to said coding network, a time quantizing circuit having its output in series connection with the output of said coding network, a decision circuit responsive to the output of the time quantized signals such that constant amplitude pulses are developed at the output of said decision circuit when the quantized signals exceed a prescribed amplitude level, two-level pulse generating means responsive to the output of said decision circuit such that the duration of one level corresponds to the time pulses from said decision circuit are present and the duration of the second level corresponds to the time no pulses from said decision circuit are present, and means responsive to the output of said two-level pulse generating means and in circuit with the input of said coding network whereby there is produced at the output of said coding network a signal approximating said input signal but opposite in polarity thereto, the error signal between said approximated signal and said input signal derived at the output of said coding network being quantized in time by the output of said quantizing circuit.

5. A delta modulation system comprising a source of input signal voltage, a coding network having an input, an output, and a reference terminal, said input signal voltage being applied to said reference terminal, a time quantizing circuit having its output in series connection with the output terminal of said coding network, means responsive to the output of the time quantized signals for producing constant amplitude pulses when the quantized signals exceed a prescribed amplitude level, a pulse widener circuit responsive to each of the constant amplitude pulses for producing pulses having a duration substantially equal to the time interval between successive constant amplitude pulses applied thereto, and means responsive to the output of said pulse widener circuit and having its output in series connection to the input terminal of said coding network whereby there is produced at the output of said coding network a signal approximating said input signal but opposite in polarity thereto, the error signal between said approximated signal and said input signal derived at the output of said coding network being quantized in time by said quantizing circuit.

6. The system in accordance with claim 5 and further including a syllabic compressor connected between said input signal source and said coding network.

7. The delta modulation circuit in accordance with claim 5 wherein said coding network comprises a four-pole network comprised of passive elements having a prescribed impulse function.

8. The system according to claim 3 wherein said decision circuit comprises a PNP junction type transistor having a base electrode, emitter electrode and a collector electrode, a first diode poled to pass negative pulses interconnecting the output of said quantizer and said base electrode, a second and third diode, each poled to pass positive pulses connected in that order in series between said base and said emitter, a first and second transformer having respective primary and secondary windings, said primary windings being in series connection with said emitter electrode, the secondary of said first transformer being connected across said third diode and adapted to invert the output of the first transformer primary winding, and a load resistor connected across the primary winding of said second transformer, the secondary winding of said second transformer being in circuit with the input of said two-level pulse generatnig means and arranged in relation to its associated primary winding such that the pulses coupled from the primary to the secondary winding are not inverted.

9. In a delta modulation system, a decision circuit comprising a PNP junction type transistor having a base electrode, an emitter electrode, and a collector electrode, a first diode poled to pass negative pulses in series connection with said base electrode, a second and third diode poled to pass positive pulses in series connection between said base electrode and ground, a first and second transformer each having a primary winding in series connection with said collector electrode, the secondary winding of said first transformer being connected in parallel across said third diode and adapted to invert the output of the first transformer primary winding, and a load resistor connected across the primary winding of said second transformer, the secondary winding of said second transformer being wound with respect to its associated primary winding such that the pulses coupled from the primary to the secondary winding are not inverted.

10. A delta modulation system comprising a coding network including passive elements and having an input terminal, an output terminal, and a reference terminal common to both said output and input terminals, an input voltage signal applied between said reference terminal and ground, means for developing a voltage signal across said input-output terminals approximating said input signal but opposite in polarity thereto, said approximated signal being added to said input signal to produce an error signal between the output terminal of said coding network and ground, said signal approximating means comprising a quantizing circuit having its output in series connection with said output terminal whereby said error signal is quantized in time, a decision circuit responsive to the time quantized signals for producng pulses of constant amplitude when said quantized signals exceed a prescribed level, and a pulse widener circuit responsive to each of the constant amplitude pulses for producing pulses having a duration substantially equal to the time interval between successive constant amplitude pulses applied thereto, the output of said pulse widener circuit being applied to said coding network input terminal.

11. A delta modulation system comprising a coding network including passive elements and having an input terminal, an output terminal and a reference terminal, an input voltage signal applied between said reference terminal and ground, a decision circuit having an input and output, a quantizing circuit in series connection between the coding network output terminal and the input of said decision circuit, said decision circuit being responsive to the output of the quantized signals such that constant amplitude pulses are developed at the output of said decision circuit when the quantized signals exceed a prescribed amplitude level, two-level pulse generating means responsive to the output of said decision circuit such that the duration of one level corresponds to the time pulses from said decision circuit are present and the duration of the second level corresponds to the time no pulses from said decision circuit are present, and amplifier means responsive to the output of said two-level pulse generating means and in circuit with the input terminal of said coding network whereby there is produced across the input-output terminal of said coding means a signal approximating said input signal but opposite in polarity thereto, the error signal between said approximated signal and said input signal derived at the output terminal of said coding network with respect to ground being quantized in time by the output of said quantizing circuit.

12. A delta modulation system in accordance with claim 1 wherein said network comprises passive elements and includes an input terminal, an output terminal and a reference terminal common to both of said input and output terminals, said input signal voltage being applied between said reference terminal and ground, and said error signal being derived between said output terminal and ground.

13. The delta modulation system in accordance with claim 5 wherein said coding network is in series connection with said voltage source and said time quantizing means.

References Cited in the file of this patent

UNITED STATES PATENTS

| | | |
|---|---|---|
| 2,662,113 | Schouten et al. | Dec. 8, 1953 |
| 2,873,388 | Trumbo | Feb. 10, 1959 |
| 2,927,962 | Cutler | Mar. 8, 1960 |